United States Patent [19]  [11] 4,298,710
Ohya et al.  [45] Nov. 3, 1981

[54] ANTISTATIC RESIN COMPOSITION

[75] Inventors: Masaki Ohya; Akio Kobayashi; Takeo Ogiwara; Yoshikatsu Satake, all of Iwaki, Japan

[73] Assignee: Kureha Kagaku Kogyo Kabushiki Kaisha, Tokyo, Japan

[21] Appl. No.: 71,377

[22] Filed: Aug. 30, 1979

[30] Foreign Application Priority Data

Sep. 6, 1978 [JP] Japan ................. 53-109285

[51] Int. Cl.$^3$ ........................... C08F 279/02
[52] U.S. Cl. ................. 525/5; 260/23.7 N; 260/30.6 R; 260/30.8 R; 260/31.2 N; 260/32.6 N; 260/DIG. 15; 260/DIG. 16; 260/DIG. 19; 260/DIG. 20; 260/DIG. 21; 525/1; 525/2; 525/3; 525/6; 525/86; 525/313; 260/30.4 N
[58] Field of Search ........... 525/1, 2, 5, 3, 6, 86, 525/313; 260/DIG. 15, DIG. 16, 23.7 N, 30.6 R, 30.8 R, 31.2 N, 31.4 N, 32.6 N, DIG. 19, DIG. 20, DIG. 21

[56]  References Cited

U.S. PATENT DOCUMENTS 3,737,420  6/1973  Brokmeier et al. ......... 260/DIG. 15
3,743,685  7/1973  Grosjean et al. ........... 260/DIG. 15
3,801,553  4/1974  Jamagrichi et al. ......... 260/DIG. 15
3,847,884  11/1974  Radlmann et al. .......... 260/DIG. 15
3,880,951  4/1975  Ooya et al. ................. 260/876 R

FOREIGN PATENT DOCUMENTS 52-151002  12/1977  Japan .

Primary Examiner—William F. Hamrock
Attorney, Agent, or Firm—Wenderoth, Lind & Ponack

[57]  ABSTRACT

An antistatic resin composition comprises 100 parts of a nitrile copolymer comprising 7 to 100% of a nitrile graft copolymer with a graft ratio of 4 to 50% obtained by graft-polymerizing a monomer mixture of a specific composition onto a rubber trunk polymer predominantly comprising a conjugated diolefin and/or an acrylate, and 0 to 93% of a nitrile random copolymer of a specific composition; and 0.05 to 10 parts of a surfactant added thereto. This antistatic resin composition, wherein the rubber trunk polymer forms a bridge structure, not only has, per se, an excellent antistatic property but also an antistatic property which undergoes substantially no change upon washing, for example, with water.

9 Claims, No Drawings

ANTISTATIC RESIN COMPOSITION

BACKGROUND OF THE INVENTION

The present invention relates to a resin composition obtained by adding an antistatic agent to a nitrile graft copolymer or a mixture thereof with a nitrile random copolymer. This composition possesses an antistatic property, which, practically, is not lowered by washing, and also has excellent processability.

As resins with transparency and hardness, polyvinyl chloride (PVC), polystyrene (PSt), polymethyl methacrylate (PMMA), polycarbonate (PC), acrylonitrile-styrene (AS) resins, acrylonitrile-butadiene-styrene (ABS) resins, and nitrile resins of a high unsaturated nitrile content are used, but these resins tend to be easily charged with static electricity and thus are liable to attract dust and dirt.

Some of the resins obtained by adding an anti-static agent to the above listed resins temporarily exhibit lowered electrical resistance. However, such resins, when shaped into articles, have a drawback in that their anti-static effect is drastically impaired upon washing of their surfaces, for example, with water. Further, in general, these resins cannot be thoroughly kneaded with antistatic agents because of the poor compatibility therebetween, and, moreover, are liable to become too smooth for the forming or shaping operation, resulting in poor processability in most cases.

On the other hand, when used in a large quantity to obtain an improved antistatic property, an antistatic agent bleeds so excessively over the surface of the shaped resin article that dust and dirt adhere thereonto in some cases.

SUMMARY OF THE INVENTION

As a result of our intensive investigation on the process for producing shaped resin articles possessing an antistatic effect lasting over a long time period even upon washing, for instance, with water, we have found that, when a specific nitrile graft copolymer is used, a shaped resin article possessing an excellent antistatic property can be obtained through the use of an ordinary antistatic agent, which resin article, practically, does not lose its antistatic property, even when the surface of the resin sample is washed or rubbed with cloth and the like, and does not suffer impairment of its processability. On the basis of this finding, we have arrived at the present invention.

More specifically, the antistatic resin composition according to the present invention comprises (1) 100 parts (by weight, as in all percentages and parts set forth hereinafter) of a nitrile copolymer comprising (A) 7 to 100% of a nitrile graft copolymer with a graft ratio of 4 to 50% obtained by polymerizing (a) 20 to 95 parts of a monomer mixture of 20 to 90% of an unsaturated nitrile and 10 to 80% of at least one vinyl and/or vinylidene monomer copolymerizable therewith in the presence of (b) 5 to 80 parts of a rubber trunk polymer predominantly comprising units of a conjugated diolefin or an acrylate, the sum of the quantities of the monomer mixture and the rubber trunk polymer amounting to 100 parts and (B) 0 to 93% of a nitrile random copolymer containing 20 to 90% of units of an unsaturated nitrile; and (2) 0.05 to 10 parts of one or more antistatic agents selected from anionic, cationic, nonionic, nonionic-anionic, and amphoteric surfactants.

While it is not sufficiently clear at present why such a remarkably high antistatic effect can be obtained, a possible reason may be that the rubber trunk polymer predominantly comprising a conjugated diolefin and/or an acrylate, when formed or processed, is dispersed in the polymer predominantly comprising an unsaturated nitrile which is a free copolymer component in the graft copolymer or random copolymer in a mutually bridged state, and that the antistatic agent added is adsorbed selectively onto the trunk polymer, whereupon the electric charge is diffused through the rubber trunk polymer phase which has adsorbed most of the antistatic agent and thus is reduced.

On the one hand, no antistatic effect which is resistant to washing can be obtained by adding an antistatic agent to the nitrile random copolymer comprising no rubber trunk polymer.

Although it can be understood fairly well from photomicrographs in what manner the rubber trunk polymer forms a bridge structure, it is still difficult to clearly identify the microstructure of the trunk polymer.

As a result of our research on the graft polymer or mixture thereof with a nitrile random copolymer of the present invention, we have found that, when the graft copolymer has a relatively low graft ratio, a high antistatic effect can be obtained.

The graft ratio as herein referred to is represented by the formula:

$$\frac{\text{Weight of branch polymers}}{\text{Weight of rubber trunk polymer}} \times 100,$$

wherein the weight of the rubber trunk polymer in a nitrile graft copolymer sample of a given weight is calculated in accordance with the formula:

Weight of sample x (Quantity of rubber trunk polymer used/Quantity of rubber trunk polymer used + Quantity of grafting monomer mixture used) on the assumption that nearly 100% of the grafting monomers are polymerized.

In order to determine the weight of the branch polymers, the polymer sample is dissolved in acetonitrile to obtain a 1% solution which is subjected to centrifugation in an ultracentrifuge at a rotational speed of 30,000 rpm. and a centrifugal acceleration of 100,000 G for 30 minutes, whereafter solvent-soluble matter (free copolymer set forth hereinafter) is removed together with a solvent. The weight of the branch polymers can be obtained as the remainder of the weight of solvent-insoluble matter (rubber trunk polymer plus branch polymers) minus the weight of the rubber trunk polymer mentioned above.

As is well known, all of the monomers added in the graft polymerization process are not grafted onto a trunk polymer, but part of the monomers forms a free copolymer. The term "free copolymer" as used herein refers to a monomer which forms a polymer without being grafted onto the rubber trunk polymer. Thus, the lower the graft ratio, the less will the trunk polymer be coated with branch polymers. If the graft ratio is high and the trunk polymer is thickly coated with branch polymers, the rubber trunk polymer cannot easily contact other trunk polymers effectively or form a bridge structure. Conversely, in the case where the graft ratio is too low, the trunk polymer is not completely coated with branch polymers, and all of the trunk polymers, when dispersed in the matrix resin, aggregate to form macroparticles, whereby formation of a bridge structure is prevented.

We have found that, when the graft ratio is 4 to 50%, preferably 6 to 40%, the rubber trunk polymer forms a bridge structure and adsorbs an antistatic agent, whereby an excellent antistatic effect can be obtained.

The resin matrix as herein referred to indicates a free copolymer in the case of the nitrile graft copolymer alone, and a total of the free copolymer and the random copolymer in the case of the mixture of the nitrile graft copolymer and the nitrile random copolymer.

Heretofore, resins containing a large quantity of an unsaturated nitrile have been developed as resins having a high gas barrier property as disclosed, for example, in the specifications of U.S. Pat. No. 3,426,102 (Sohio Corp.), U.S. Pat. No. 3,451,538 (Monsanto Co.) and U.S. Pat. No. 3,880,951 (KUREHA KAGAKU KOGYO, K. K.). However, these resins have such compositions that the rubber phase possessing a poor gas barrier property does not form a bridge structure thereby to maintain a high gas barrier property. In this regard there lies a key difference between the prior art resins and the resin of the present invention which has a composition deliberately selected so as to form a bridge structure.

DETAILED DESCRIPTION OF THE INVENTION

While it is essential in the present invention that the rubber trunk polymer maintaining a bridge structure be dispersed in the entire polymer, it is also essential that the trunk polymer be present in a given ratio.

In accordance with this invention, good results can be obtained by a resin composition wherein the ratio of the rubber trunk polymer to the total of the monomer mixture and rubber trunk polymer ranges from 5 to 80%, preferably from 7 to 70%, and more preferably from 10 to 50%. If the ratio of the rubber trunk polymer is lower, no antistatic property resistant to washing can be obtained. Conversely, the rubber trunk polymer in higher ratios results in poor processability and provides soft shaped articles, so that the utility of the resin composition will be limited. Further, the antistatic agent added easily bleeds over the surface of a shaped resin article and dust may adhere thereonto. For these reasons, the use of the trunk polymer in higher ratios is undesirable. If the contents of the rubber trunk polymer are equal, a nitrile graft copolymer alone has a higher antistatic property than a mixture thereof with a nitrile random copolymer.

The rubber trunk polymer according to the present invention predominantly comprises either one or both of a conjugated diolefin and an acrylate. The term "to predominantly comprise" as herein used is intended to mean that the stated component constitutes 50% or more of the whole composition. This rubber trunk polymer is prepared by copolymerizing the same, if desired, with methacrylates, acrylic acid, methacrylic acid, acrylamide, methacrylamide, vinyl acetate, aromatic vinyl compounds, alkyl vinyl ketones, alkyl vinyl ethers, vinyl chloride, vinylidene chloride, isobutylene, (alkoxy)polyethylene glycol acrylate, (alkoxy)polyethylene glycol methacrylate, 2-hydroxyethyl acrylate, diacetone acrylamide, polyfunctional monomers, and one or more monomers copolymerizable therewith.

For polyfunctional monomers copolymerizable with the above listed monomers, known polyfunctional monomers such as those having two or more of at least one species of 1,3-butadienyl group, vinyl group, acryloxy group, methacryloxy group, and allyl group can be used.

For the monomer mixture to be grafted onto the rubber trunk polymer, a monomer mixture comprising 20 to 90%, preferably 40 to 85%, and more preferably 50 to 80%, of an unsaturated nitrile, the remainder being a monomer copolymerizable therewith, is used. An unsaturated nitrile in smaller quantities cannot readily exhibit an antistatic property, while that in larger quantities gives an increased melt viscosity, resulting in poor processability as well as low heat stability.

Examples of suitable unsaturated nitriles are acrylonitrile and methacrylonitrile, but these are mentioned not by way of limitation.

For monomers copolymerizable with the unsaturated nitriles, known vinyl and vinylidene monomers are used. Examples of such monomers are: conjugated diolefins, alkyl acrylates, alkyl methacrylates, acrylic acid, methacrylic acid, acrylamide, methacrylamide, vinyl acetate, aromatic vinyl compounds, vinyl chloride, vinylidene chloride, isobutylene, alkyl vinyl ethers, alkyl vinyl ketones, 2-hydroxyethyl acrylate, (alkoxy)polyethylene glycol acrylate, (alkoxy)polyethylene glycol methacrylate, and diacetone acrylamide.

For a nitrile random copolymer which can be blended with the nitrile graft copolymer, a monomer mixture comprisng 20 to 90%, preferably 40 to 85%, and more preferably 50 to 80% of an unsaturated nitrile, the remainder being a monomer copolymerizable therewith, is used, and, for this monomer, the above enumerated monomers for graft polymerization are similarly used.

The resin composition according to the present invention is herein defined in terms of the composition of the monomers prior to polymerization, but, since the degree of polymerization is ordinarily 95% or higher, the resin composition per se has substantially the same composition as that of the monomers.

The antistatic agents employed in the present invention include those selected from commonly used anionic, cationic, nonionic, nonionic-anionic, and amphoteric surfactants.

Examples of the anionic surfactants are alkyl sulfates, alkyl sulfonates, alkylbenzene sulfonates, sulfosuccinates, and esters of aliphatic alcohols and phosphoric acid and phosphates; examples of the cationic surfactants are primary amine salts, secondary amine salts, tertiary amine salts, quaternary ammonium compounds, and pyridine derivatives; examples of the nonionic surfactants are alkylene oxide adducts of aliphatic alcohols, alkylene oxide adducts of a fatty acid, aklylene oxide adducts of alkylphenol and alkylnaphthol, alkylene oxide adducts of polyhydric alcohols, alkylene oxide adducts of aliphatic amines and aliphatic amides, polyethylene glycol, and block copolymers of polyethylene glycol and polypropylene glycol; examples of nonionic-anionic surfactants are mono- and diesters of polyoxyethylene alkyl ethers and polyoxyethylene alkylaryl ethers and phosphoric acid, polyoxyethylene alkyl ether sulfates, and polyoxyethylene alkylphenol ether sulfates; and examples of the amphoteric surfactants are alkylbetaine and imidazoline derivatives.

One or more of the antistatic agents set forth above are added in a quantity of 0.05 to 10 parts, preferably 0.2 to 3 parts, for 100 parts of the nitrile copolymer. If the antistatic agent is added in a smaller quantity, substantially no effect of improving the antistatic property of the resin composition can be obtained. On the other hand, a greater quantity of the antistatic agent is undesirable since not only is the processability of the composition adversely affected but also the mechanical properties thereof deteriorate because of the adhesion of dust and dirt onto the surface of a shaped resin article due to bleeding of the antistatic agent thereover, or because of the increased hygroscopicity of the resin composition.

While the nitrile graft copolymer of this invention can be prepared by an ordinary graft polymerization process using emulsion polymerization, suspension polymerization or bulk polymerization, emulsion polymerization is most suitable for effectively controlling the dispersion of the rubber trunk polymer.

A suitable average particle size of the rubber trunk polymer as measured in emulsion state is 0.03 to 0.5μ, preferably 0.05 to 0.3μ. In the case where the trunk polymer has a smaller average particle size, it is difficult to produce the graft copolymer by emulsion polymerization. A trunk polymer having a larger average particle size is also undesirable because a longer polymerization time is required.

In accordance with the present invention, transparent resin products can easily be obtained by controlling the refractive indices of the rubber trunk polymer and branch polymer, although the products obtained are not limited to transparent products.

The nitrile resin composition of the present invention possessing an excellent antistatic property can be formed or molded by an ordinary process, for example, injection molding, extrusion molding, compression molding, or vacuum forming. Accordingly, this resin composition can be formed into plastic moldings, sheets, films, tubes, and fibers.

The resin composition of the present invention is suitable for use, for instance, in electrical appliances or accessaries thereof (e.g., cassette tape recorder cases, front covers of picture tubes, record player covers, dust collectors and hoses of vacuum cleaners, covers of instruments, IC element casings, and various cases); packaging materials (e.g., doll cases, cans, bottles, and packaging films); acoustic materials (e.g., audio discs, video discs, and tapes for tape recorders); building materials (e.g., wall materials, flooring materials, panels, and window materials); lighting equipment (e.g., lamp shades, and displays); and plastics in general wherein an antistatic property is required.

In order to indicate more fully the nature and utility of this invention, the following specific examples of practice constituting preferred embodiments of the invention, and comparison examples, are set forth, it being understood that these examples are presented as illustrative only and are not intended to limit the scope of the invention. Throughout these examples, ratios are weight ratios.

Test specimens were measured 7 days after forming and 7 days after washing with water as described in Example 1. The data obtained show that the resin products according to the present invention have a satisfactory antistatic property immediately after forming or washing with water. Thus, the antistatic property achieved by the present invention is not due to bleeding of the antistatic agent over the surface of the resin product with the elapse of time.

EXAMPLE 1

An aqueous dispersion composed of the following ingredients was adjusted to a pH of 7 with an aqueous solution of sodium hydroxide and charged into a 10-l stainless steel autoclave provided with agitating blades.

|     |     | Part |
| --- | --- | --- |
| (a) | 1,3-butadiene | 6 |
|     | methyl acrylate | 4 |
|     | tertiary dodecylmercaptan | 0.05 |
|     | diisopropylbenzene hydroperoxide | 0.02 |
|     | formaldehyde sodium sulfoxylate | 0.01 |
|     | ferrous sulfate heptahydrate | 0.0004 |
|     | disodium ethylenediaminetetraacetate | 0.0006 |
|     | sodium pyrophosphate | 0.05 |
|     | sodium dodecylbenzenesulfonate | 0.1 |
|     | deionized water | 30 |

The atmosphere within the autoclave was thoroughly purged with nitrogen, and the reaction mixture was agitated at 40° C. for 20 hours, whereupon a rubber latex of an average particle size of 0.08 μm was obtained in a yield of 99%.

To 40 parts (10 parts as a rubber trunk polymer) of this rubber latex were added the following ingredients.

|     |     | Parts |
| --- | --- | --- |
| (b) | acrylonitrile | 54 |
|     | methyl acrylate | 36 |
|     | normal dodecylmercaptan | 3.6 |
|     | potassium persulfate | 0.072 |
|     | sodium hydrogensulfite | 0.018 |
|     | sodium dodecylbenzenesulfonate | 0.9 |
|     | deionized water | 270 |

The atmosphere within the autoclave was purged with nitrogen, and the reaction mixture was subjected to graft copolymerization at 50° C. for 20 hours under agitation. The resulting latex was withdrawn from the autoclave, and then subjected to deposition with an aqueous aluminum sulfate solution, adjusted to a pH of 7 with an aqueous sodium pyrophosphate solution, dehydrated, washed, and dried at 55° C. for 24 hours. As a result, a white powder was obtained in a yield of 97%. The graft copolymer thus obtained was found to have a graft ratio of 16.2%.

To 100 parts of this powder was added 0.5 part of $C_{12}H_{25}O(CH_2CH_2O)_3SO_3Na$ as an antistatic agent, and both were thoroughly mixed in a Henschel mixer.

The resulting powder was kneaded with rolls having a surface temperature of 135° C. for 3 min. and pressed at 160° C. and 200 Kg/cm$^2$ for 5 min. to prepare test specimens of 0.6 to 0.8 mm thickness. These test specimens were stored under normal conditions of 23° C. and 50% RH for a week, and thereafter the half-life of the charged voltage was measured by means of a Static Honest Meter (mfd. by Shishido Shokai, Japan) to evaluate the antistatic property thereof. The results obtained are shown in Table 1.

The measurement conditions were as follows.

| Applied voltage | 8,000 V |
| --- | --- |
| Rotational speed | 1,450 rpm. |
| Temperature | 23° C. |
| Humidity | 50-55% RH |
| Time period | 1 min. |

In order to evaluate the antiwashing property, the surface of each test specimen was thoroughly washed with an aqueous solution of a commercially available detergent (mfd. by Lion Yushi K. K., Japan, under the trade name "Mama Lemon") and then thoroughly washed with distilled water. The specimens were stored under the conditions of 50% RH and 23° C. for a week to adjust their moisture content, whereafter the charged voltage was measured by means of the Static Honest Meter. The results are set forth in Table 1.

COMPARISON EXAMPLE 1

60 parts of acrylonitrile and 40 parts of methyl acrylate were subjected to copolymerization in the presence of 1.5 parts of normal dodecylmercaptan as a molecular weight regulator, whereupon a copolymer was obtained in a yield of 96%.

Test specimens were prepared in the same manner as in Example 1 by adding 0.5 part of the same antistatic agent to 100 parts of the copolymer obtained as described above. After adjustment of the moisture content of these specimens, the half-life of the charged voltage was measured by means of the Static Honest Meter, and the results shown in Table 1 were obtained.

COMPARISON EXAMPLE 2

30 parts of acrylonitrile containing 1.2 parts of normal dodecylmercaptan as a molecular weight regulator and 20 parts of methyl acrylate were graft-copolymerized onto a rubber trunk polymer of an average rubber particle size of 0.075 μm obtained in a yield of 99% by copolymerizing 30 parts of 1,3-butadiene and 20 parts of methyl acrylate in the presence of 0.25 part of tertiary dodecylmercaptan as a molecular weight regulator, whereupon a copolymer was obtained in a yield of 96%.

20 parts of this copolymer (graft ratio: 61%) was admixed with 80 parts of the copolymer of Comparison Example 1 in latex form, and the mixture was subjected to salting out. To 100 parts of the resulting copolymer mixture was added 0.5 part of the same antistatic agent as was used in Example 1.

Test specimens were prepared from the powder thus obtained in exactly the same manner as in Example 1. After adjustment of the moisture content of these specimens, the half-life of the charged voltage was measured by means of the Static Honest Meter. The results obtained are shown in Table 1.

COMPARISON EXAMPLE 3

A test specimen was prepared as in Example 1 except that no antistatic agent was added, and the antistatic property of the specimen was evaluated by means of the Static Honest Meter. The results obtained are set forth in Table 1.

TABLE 1

|  | Half-life of charged voltage (sec.) | |
|---|---|---|
|  | Untreated | Washed with water |
| Example 1 | 6 | 5 |
| Comparison Example 1 | 1 | ∞ |
| Comparison Example 2 | 5 | 2400 |
| Comparison Example 3 | 600 | 580 |

EXAMPLES 2 THROUGH 16

Test specimens were prepared substantially in the manner set forth in Example 1 except that the composition of the resin used therein was modified as shown in Table 2, and the antistatic property of each of the specimens was evaluated by means of the Static Honest Meter. The results are summarized in Table 2.

In each of these Examples, 0.5 part of the antistatic agent of the following formula was added.

TABLE 2

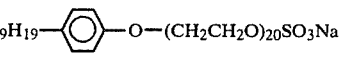

$C_9H_{19}-\phi-O-(CH_2CH_2O)_{20}SO_3Na$

| Example | Composition of resin (wt. %) | | | | | | Half-life of charged voltage (sec) | | Graft ratio (%) |
|---|---|---|---|---|---|---|---|---|---|
|  | Rubber trunk polymer | | | Branch polymer | | | Untreated | Washed with water |  |
| 2 | But 12 | MA 8 | DVB 0.04 | MAN 48 | MMA 32 | NDM 1.0 | 4 | 4 | 23.5 |
| 3 | But 12 | MA 8 | TDM 0.1 | MAN 48 | BMA 32 | NDM 1.0 | 1 | 2 | 13.2 |
| 4 | But 12 | MA 8 | TDM 0.1 | AN 48 | BMA 32 | NDM 3.2 | 2 | 2 | 15.3 |
| 5 | But 12 | MA 8 | DVB 0.04 | AN 40 | St 40 | NDM 1.0 | 2 | 2 | 29.3 |
| 6 | But 12 | MA 8 | TDM 0.1 | AN 48 | MA 32 | NDM 3.2 | <1 | 1 | 12.2 |
| 7 | But 18 | MA 12 | TDM 0.15 | AN 42 | MA 28 | NDM 2.8 | <1 | 1 | 22.0 |
| 8 | But 24 | MA 16 | TDM 0.2 | AN 36 | MA 24 | NDM 2.4 | <1 | 1 | 32.0 |
| 9 | BA 15 | AA 0.3 |  | AN 51 | MA 34 | NDM 3.14 | 2 | 3 | 8.4 |
| 10 | But 9 | MMA 6 | TDM 0.075 | AN 51 | MA 34 | NDM 3.14 | 2 | 2 | 14.2 |
| 11 | But 9 | BA 6 | TDM 0.75 | AN 51 | MA 34 | NDM 3.14 | 1 | 1 | 17.8 |
| 12 | But 20 | TDM 0.15 |  | AN 48 | MA 32 | NDM 3.2 | 18 | 20 | 39.2 |
| 13 | But | MA | AN | AN 48 | MA | NDM | <1 | <1 | 14.5 |

TABLE 2-continued $$C_9H_{19}-\langle\bigcirc\rangle-O-(CH_2CH_2O)_{20}SO_3Na$$

| Example | Composition of resin (wt. %) | | | | | | Half-life of charged voltage(sec) | | Graft ratio (%) |
| --- | --- | --- | --- | --- | --- | --- | --- | --- | --- |
| | Rubber trunk polymer | | | Branch polymer | | | Untreated | Washed with water | |
| 14 | But 12 | MA 6 | TDM 2 | AN 48 | MA 32 | NDM 3.2 | 3 | 2 | 18.3 |
| 15 | But 12 | St 8 | TDM 0.1 | AN 64 | MA 16 | NDM 3.2 | 17 | 16 | 38.8 |
| 16 | But 12 | DVB 8 | | AN 48 | MA 32 | NDM 3.2 | 45 | 40 | 38.3 |
| | 15 | 0.15 | | 34 | 51 | 2.5 | | | |

The symbols used in Table 2 stand for the following monomers, cross-linking agents and chain tranfer agents.

| But | butadiene |
| --- | --- |
| MA | methyl acrylate |
| MAN | methacrylonitrile |
| MMA | methyl methacrylate |
| BMA | normal butyl methacrylate |
| AN | acrylonitrile |
| St | styrene |
| BA | normal butyl acrylate |
| DVB | divinylbenzene |
| AA | allyl acrylate |
| NDM | normal dodecylmercaptan |

| | -continued |
| --- | --- |
| TDM | tertiary dodecylmercaptan |

EXAMPLES 17 THROUGH 29

Test specimens were prepared substantially as in Example 13 except that the antistatic agent was modified as shown in Table 3, and the antistatic property of each of the specimens was evaluated by means of the Static Honest Meter. The results obtained are shown in Table 3.

The quantity of the antistatic agent added in each of these Examples was 0.5 part.

TABLE 3

| Example | Type of antistatic agent | Half-life of charged voltage (sec.) | |
| --- | --- | --- | --- |
| | | Untreated | Washed with water |
| 17 | $C_{12}H_{25}O(CH_2CH_2O)_{20}SO_3Na$ | 1 | 1 |
| 18 | $C_9H_{19}-\langle\bigcirc\rangle-O(CH_2CH_2O)_{20}H$ | 3 | 4 |
| 19 | $C_{12}H_{25}O-(CH_2CH_2O)_{20}H$ | 1 | 2 |
| 20 | $H(OCH_2CH_2)_4OHC\underset{CH}{\overset{H_2C}{\diagup}}\overset{O}{\diagdown}\underset{O(CH_2CH_2O)_4H}{\overset{CH-CH_2OOCC_{17}H_{35}}{\diagdown}}CHO(CH_2CH_2O)_4H$ | 7 | 9 |
| 21 | $C_{18}H_{37}-N\diagdown\overset{(CH_2CH_2O)_{20}H}{\underset{(CH_2CH_2O)_{20}H}{}}$ | 3 | 3 |
| 22 | $C_{11}H_{23}COO(CH_2CH_2O)_{20}H$ | 4 | 3 |
| 23 | $HO(C_2H_4O)_{27}(C_3H_5O)_{30}H$ | 4 | 5 |
| 24 | $C_9H_{19}-\langle\bigcirc\rangle-O-(CH_2CH_2O)_{20}SO_3Na$ | 1 | 2 |
| 25 | $C_{12}H_{25}-\langle\bigcirc\rangle-SO_3Na$ | 42 | 48 |
| 26 | $C_{12}H_{25}-N^+\diagup\overset{CH_3}{\underset{CH_2COO^-}{\overset{CH_3}{}}}$ | 33 | 31 |
| 27 | $\left(C_{12}H_{25}-\underset{CH_3}{\overset{CH_3}{\underset{|}{\overset{|}{N}}}}-CH_3\right)^+ Cl^-$ | 5 | 6 |
| 28 | $\underset{C_{12}H_{25}-O}{\overset{C_{12}H_{25}-O}{\diagdown}}\overset{O}{\underset{\|}{P}}-ONa$ | 53 | 70 |
| 29 | 1:1 mixture of | 1 | 1 |

TABLE 3-continued

| Example | Type of antistatic agent | Half-life of charged voltage (sec.) | |
|---|---|---|---|
| | | Untreated | Washed with water |
| | $C_{18}H_{35}O(CH_2CH_2O)_7\diagdown$ | | |
| | $\qquad\qquad\qquad P{=}O$ | | |
| | $NaO\diagup\quad\diagdown ONa$ | | |
| | and | | |
| | $C_{18}H_{35}O(CH_2CH_2O)_7\diagdown$ | | |
| | $\qquad\qquad\qquad P{=}O$ | | |
| | $C_{18}H_{35}O(CH_2CH_2O)_7\diagup\quad\diagdown ONa$ | | |

EXAMPLE 30

Test specimens were prepared substantially as in Example 1 except that the type and quantity of the antistatic agent added were modified as shown below, and the antistatic property thereof was similarly evaluated.

| | |
|---|---|
| $C_{12}H_{25}O\diagdown\quad\diagup ONa$ | 0.23 part |
| $\qquad\quad P$ | |
| $C_{12}H_{25}O\diagup\quad\diagdown O$ | |
| Polyethylene glycol (molecular weight: ca.1000) | 0.27 part |

The results obtained were as follows.

| | Half-life of charged voltage (sec.) |
|---|---|
| Untreated | 5 |
| Washed with water | 6 |

EXAMPLES 31, 32 and 33

A monomer mixture of 18 parts of acrylonitrile containing 0.72 part of normal dodecyl mercaptan as a molecular weight regulator and 12 parts of methyl acrylate was graft-polymerized onto a rubber polymer of an average rubber particle size of 0.075 μm obtained in a yield of 99% by copolymerizing 42 parts of 1,3-butadiene and 28 parts of methyl acrylate in the presence of 0.35 part of tertiary dodecylmercaptan as a molecular weight regulator to prepare a graft copolymer (A) (graft ratio: 18%).

This graft copolymer (A) was admixed with the random copolymer (B) of Comparison Example 1 in latex form in the ratios set forth in Table 4, and each mixture was subjected to salting out. To 100 parts of each resulting copolymer mixture was added, as an antistatic agent, 0.5 part of a 1:1 mixture of

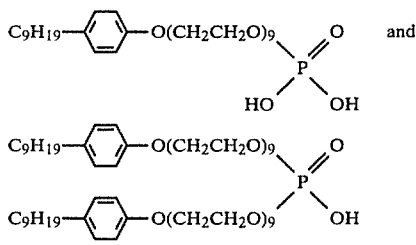

and both were thoroughly mixed in a Henschel mixer.
Test specimens were prepared from the resulting powder mixtures in the same manner as in Example 1, and the antistatic property of each of the specimens was similarly evaluated. The results are summarized in Table 4.

TABLE 4

| Example | Graft copolymer (A) (wt. %) | Random copolymer (B) (wt. %) | Half-life of charged voltage (sec.) | |
|---|---|---|---|---|
| | | | Untreated | Washed with water |
| 31 | 15 | 85 | 6 | 5 |
| 32 | 30 | 70 | 1 | 2 |
| 33 | 60 | 40 | 1 | 1 |

COMPARISON EXAMPLES 4 THROUGH 7

The antistatic property of each of the commercially available antistatic-grade resins shown in Table 5 was evaluated by measuring the half-life of the charged voltage by means of the Static Honest Meter as in the preceding Examples. The results obtained are tabulated below.

TABLE 5

| Comparison Example | Commercially available antistatic-grade resin | Half-life of charged voltage (sec.) | |
|---|---|---|---|
| | | Untreated | Washed with water |
| 4 | AS resin | 18 | >3600 |
| 5 | ABS resin (mfd. by A company) | >3600 | >3600 |
| 6 | ABS resin (mfd. by B company) | 10 | >3600 |
| 7 | Polycarbonate | >3600 | >3600 |

We claim:
1. An antistatic resin composition with an anti-washing property comprising:
   (1) 100 parts of a nitrile copolymer comprising
      (A) 7 to 100% of a nitrile graft copolymer with a graft ratio of 4 to 50% obtained by polymerizing
         (a) 20 to 95 parts of a monomer mixture of 20 to 90% of an unsaturated nitrile and 10 to 80% of at least one vinyl and/or vinylidene monomer copolymerizable therewith
      in the presence of
         (b) 5 to 80 parts of a rubber trunk polymer predominantly comprising a conjugated diolefin,
      the sum of the quantities of the monomer mixture and the rubber trunk polymer amounting to 100 parts, and
      (B) 0 to 93% of a nitrile random copolymer containing 20 to 90% of an unsaturated nitrile; and
   (2) 0.05 to 10 parts of one or more antistatic agents selected from the group consisting of anionic, cationic, nonionic, nonionic-anionic, and amphoteric surfactants; all quantities in terms of parts and per- centages being by weight wherein the rubber trunk polymer is dispersed in a resin matrix in a mutually bridged state, said resin matrix being a free copolymer formed from that portion of the monomer mixture which is not grafted onto the rubber trunk polymer, or a combination of ssid free copolymer and the nitrile random compolymer.

2. An antistatic resin composition as claimed in claim 1, wherein the quantity of the antistatic agent is 0.2 to 3 parts for 100 parts of the nitrile copolymer.

3. An antistatic resin composition as claimed in claim 1, wherein the antistatic agent is a nonionic-anionic surfactant.

4. An antistatic resin composition as claimed in claim 1, wherein the antistatic agent is a nonionic surfactant.

5. An antistatic resin composition as claimed in claim 1, wherein the ratio of the quantity of the rubber trunk polymer to the total quantity of the monomer mixture and rubber trunk polymer is 7 to 70%.

6. An antistatic resin composition as claimed in claim 1, wherein the ratio of the quantity of the rubber trunk polymer to the total quantity of the monomer mixture and rubber trunk polymer is 10 to 50%.

7. An antistatic resin composition as claimed in claim 1, wherein the content of the unsaturated nitrile in the monomer mixture to be polymerized in the presence of the rubber trunk polymer to form the nitrile graft copolymer is 50 to 80%.

8. An antistatic resin composition as claimed in claim 1, wherein the content of the unsaturated nitrile in the nitrile random copolymer is 50 to 80%.

9. An antistatic resin composition as claimed in claim 1, wherein the rubber trunk polymer has an average particles size of 0.03 to $0.5\mu$.

* * * * *